United States Patent [19]

Tanaka et al.

[11] 4,350,981
[45] Sep. 21, 1982

[54] CAPACITIVE ROTATIONAL POSITION DETECTOR

[75] Inventors: Hiroaki Tanaka; Sigeyuki Akita, both of Okazaki, Japan

[73] Assignee: Nippon Soken, Inc., Nishio, Japan

[21] Appl. No.: 159,855

[22] Filed: Jun. 16, 1980

[30] Foreign Application Priority Data

Jul. 2, 1979 [JP] Japan .................................. 54-84288

[51] Int. Cl.³ ................................................ G08C 19/10
[52] U.S. Cl. ............................ 340/870.37; 324/61 R
[58] Field of Search ..................... 340/870.37, 347 P; 324/61 R; 318/662; 323/93

[56] References Cited

U.S. PATENT DOCUMENTS

| | | | |
|---|---|---|---|
| 3,760,392 | 9/1973 | Stich | 340/870.37 |
| 3,873,916 | 3/1975 | Sterki | 324/61 R |
| 3,961,318 | 6/1976 | Farrand et al. | 340/870.37 |
| 4,092,579 | 5/1978 | Weit | 318/662 |
| 4,199,800 | 4/1980 | Weit | 340/870.37 |

FOREIGN PATENT DOCUMENTS 51-49421 12/1976 Japan ............................. 340/870.37

*Primary Examiner*—James J. Groody
*Attorney, Agent, or Firm*—Cushman, Darby & Cushman

[57] ABSTRACT

A capacitive rotational position detecting apparatus includes a stationary disk plate and a rotatable disk plate in opposite relation. The stationary plate has a first and a second electrode on one surface, each of which is electrically connected through apertures by a metal film formed on the other surface of the stationary plate to reduce a distribution capacitance formed between metal films of the stationary and rotatable plates.

3 Claims, 8 Drawing Figures

CAPACITIVE ROTATIONAL POSITION DETECTOR

The present invention relates to an apparatus for detecting the rotational position of a crankshaft of an engine in an automobile or the like by utilizing static capacitance, and particularly to a rotation detecting electrode structure capable of easily and instantly detecting the rotation position by utilizing static capacitance.

There has been proposed an apparatus for detecting rotation position by static capacitance, in which a rotor with the outer peripheral surface shaped like a gear is used to rotate with the rotation of a shaft and a stator with the inner peripheral surface shaped like a gear to oppose the outer peripheral surface of the rotor is used to form a static capacitance with the rotor, thus the capacitance to be detected being changed as the distance therebetween changes with the rotation.

In this kind of apparatus, however, to increase the number of signals to be detected per revolution of the shaft, it is necessary to increase the number of gear-like electrodes provided on the rotor and stator. This is not only difficult but increases the distributed capacitance, making it difficult to detect the static capacitance change.

There has also been proposed a rotation position detecting apparatus which obviates the above defects as disclosed in the Japanese Patent Publication No. 49421/1976. This apparatus includes stationary and rotating plates made of insulating material which have metal film electrodes arranged in the circumferential direction so that the rotation can be detected by the static capacitance change between the electrodes of the plates. Since the electrodes are interconnected by a metal film on the same plane of each plate, the distributed capacitance of the connecting metal film for the electrodes of each plate acts to reduce the static capacitance change occuring due to the rotation of the rotating plate and thus decrease the change of the signal appearing at the electrodes on the output side, so that satisfactory detection of the rotation can not be effected.

Accordingly, the present invention proposes a rotation detecting apparatus so arranged that in order to solve the above problems, first and second plates are provided to oppose to each other, the first plate having first and second electrodes alternately arranged at constant intervals in the circumferential direction so as to oppose to the electrodes of the first plate which are formed at constant intervals in the circumferential direction, and the electrodes of either of the first and second plates are electrically connected together on the rear side of the plate through apertures provided therein, thereby decreasing the distributed capacitance between the electrodes of the first and second plates so as to increase the change of a signal appearing at the electrodes on the output side of the second plate.

These and other objects, features and advantages of this invention will be apparent from the following description taken in conjunction with the accompanying drawings, in which.

An embodiment of this invention will hereinafter be described with reference to the drawings.

Figure 1:
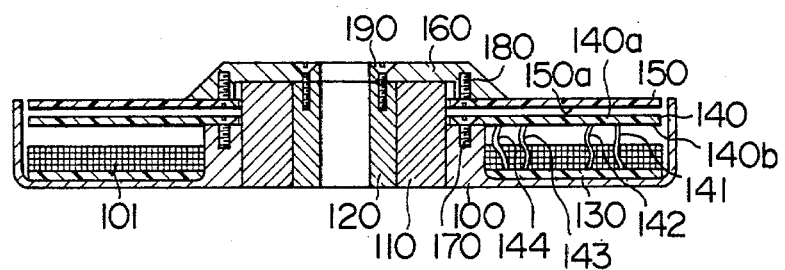
FIG. 1 is a longitudinal cross-section of one embodiment of the apparatus according to the invention.

Referring to FIG. 1, reference numeral 100 represents a housing which is fastened to the outside of a bearing 110, and 120 a shaft fastened on the inside of the bearing 110 and connected to, for example, the crankshaft of an engine. Thus, when the shaft 120 rotates, a rotating member 160 which is fastened to the shaft 120 with screws 190 is rotated together with the shaft 120. To the rotating member 160 is secured with screws 180 a second disk plate 150 which is formed of a printed board on which electrodes are formed by printing, which disk plate is rotated with the revolution of the rotating member 160. Moreover, a first disk plate 140 formed of a printed board on which electrodes are printed is fastened to the housing 100 with screws 170, and connected with signal lines 141, 142, 143 and 144 from a detector circuit 101 which is mounted on a printed board 130 secured to the housing 100.

Figure 2:
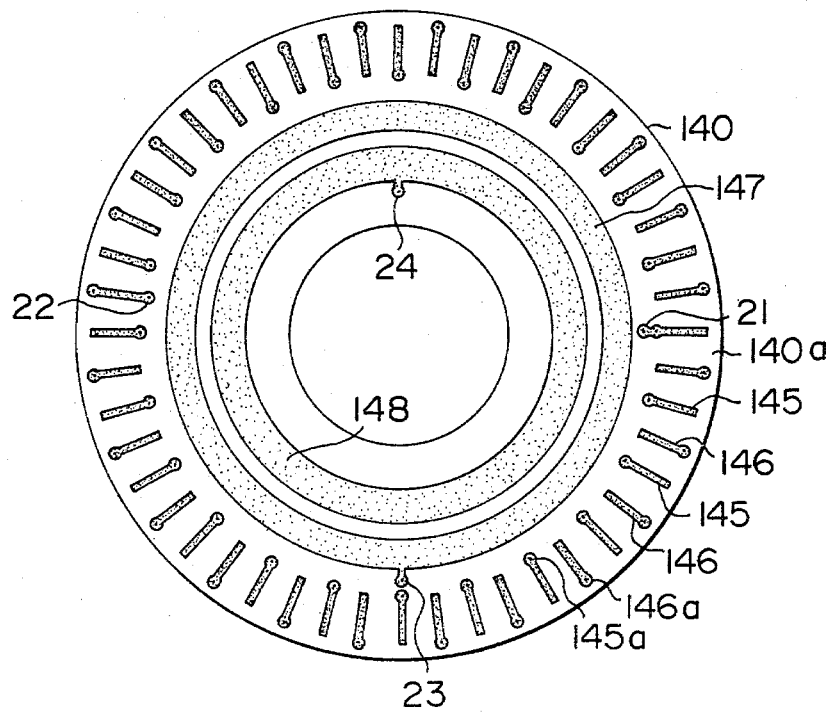
FIGS. 2 and 3 are front and rear surface views of the first plate in the apparatus of FIG. 1.
Figure 3:
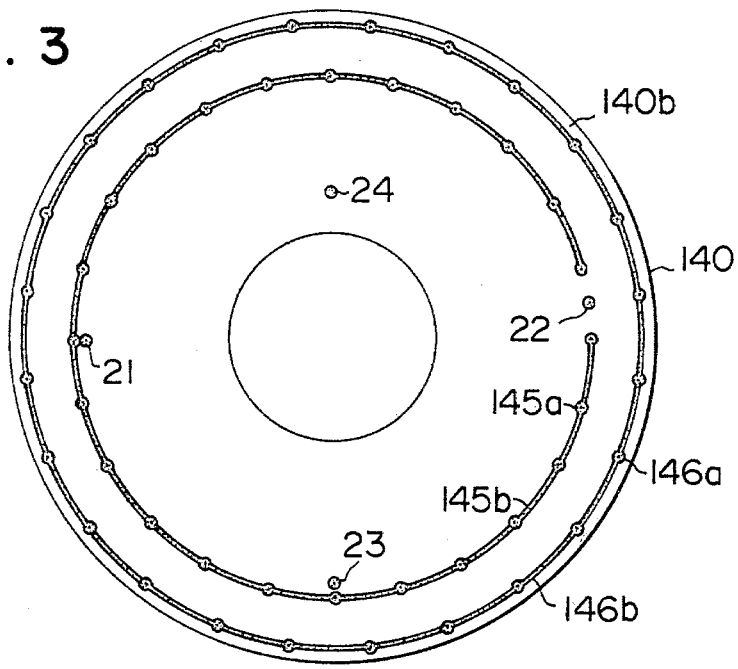

FIG. 2 shows a side 140a of the first plate 140, opposing to the second plate 150. The signal lines 141, 142, 143 and 144 are connected through junctions 21, 22, 23 and 24 each being of metal film, to first metal film electrodes 145, second metal film electrodes 146, a third circular electrode 147 of metal film and a fourth circular electrode 148 of metal film, of the first plate 140, respectively. The first and second electrodes 145 and 146 are alternately arranged in the circumferential direction to have a predetermined spacing therebetween. The inner ends of the first electrodes 145 and the outer ends of the second electrodes 146 are provided with apertures 145a, 146a, respectively which are board through the first plate 140. As shown in FIG. 3, on a rear surface 140b opposite to the surface 140a, the electrodes 145 are electrically interconnected by a metal film connection 145b through the apertures 145a and similarly the electrodes 146 are electrically interconnected by a metal film connection 146b through the apertures 146a.

Figure 4:
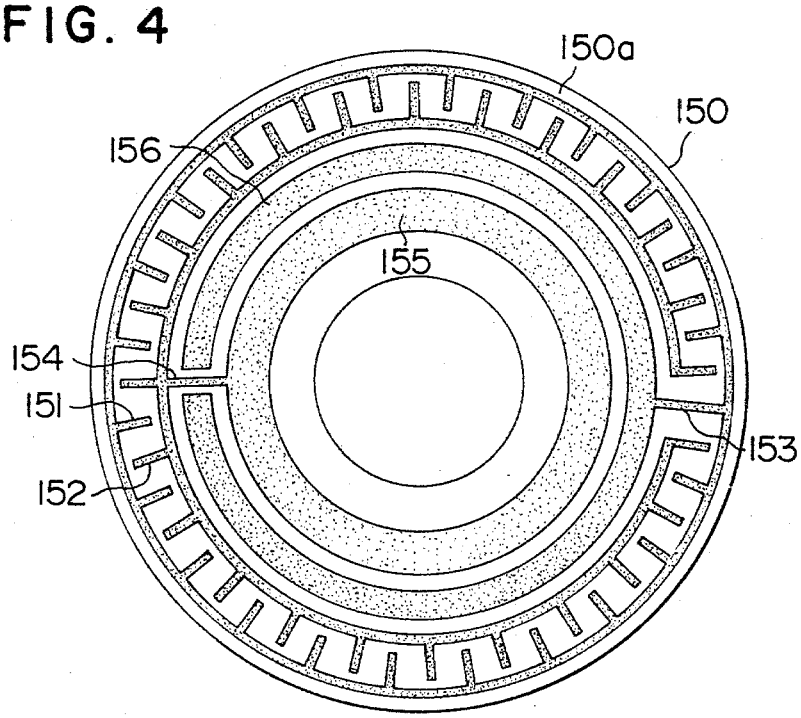
FIG. 4 is a front surface view of the second plate in the apparatus of FIG. 1.

FIG. 4 shows a side 150a of the second plate 150, opposing the first plate 140. First toothed metal film electrodes 151 are connected to a third circular electrode 156 of metal film by a lead metal wire 153, and second toothed metal film electrodes 152 to a fourth circular electrode 155 by a lead metal wire 154. The first and second electrodes 151 and 152 are disposed so that their equispaced radial teeth are alternately interdigitated with each other in the circumferential direction. On the plates 140 and 150, the electrodes 146, 145, 147 and 148 are respectively opposed to the electrodes 151, 152, 156 and 155, in which case all the electrodes are formed by printing.

Figure 5:
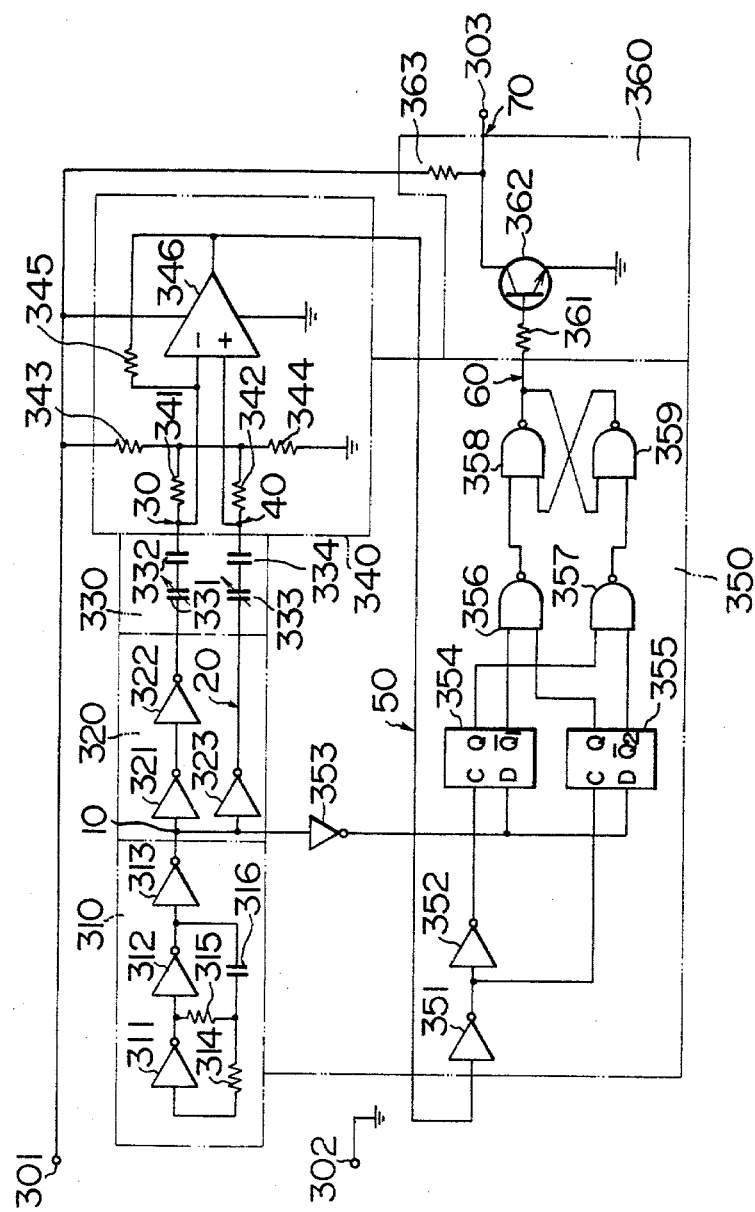
FIG. 5 is an electric circuit diagram of the detection circuit in the apparatus of FIG. 1.

FIG. 5 is an electrical wiring diagram of the detector circuit 101. Referring to FIG. 5, there are shown a power supply terminal 301 to which a constant voltage $V_c$ is applied, and a terminal 302 which is grounded. Shown at 310 is a known CR oscillator, 320 a reference signal generator, 330 a detector having the upper electrodes 151, 152, 156 and 155 and the lower electrodes 146, 145, 147 and 148, 340 a comparator, 350 a phase detector, 360 an output circuit, and 303 an output terminal.

Figure 7:
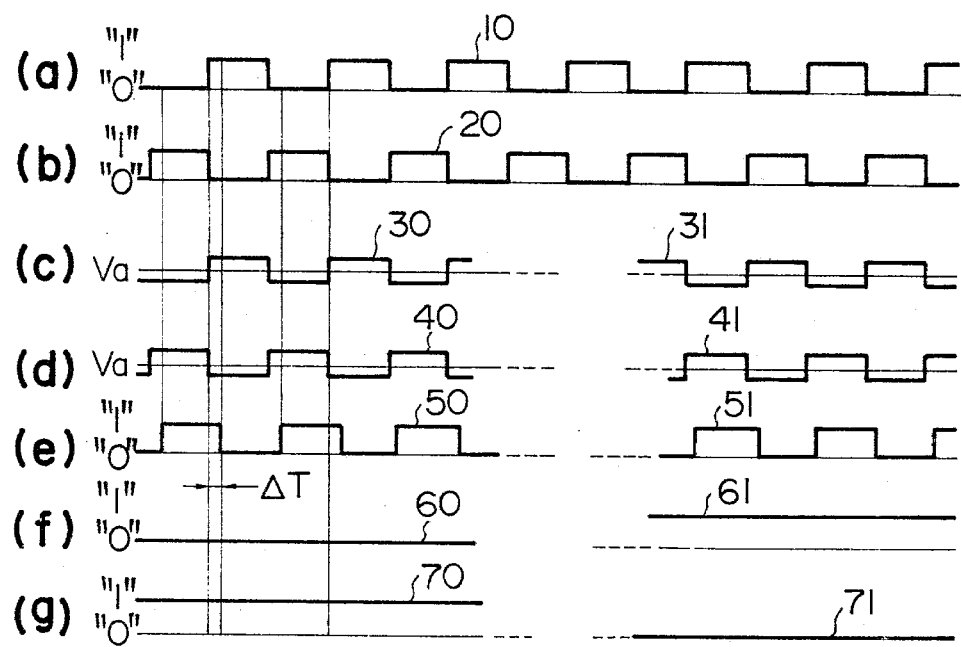
FIG. 7 is a waveform diagram of each signal to which reference is made in explaining the operation of the above embodiment.

The operation of the above-mentioned arrangement will next be described. As shown in FIG. 5, the CR oscillator 310 consists of inverter gates 311, 312 and 313, resistors 314 and 315 and a capacitor 316 and produces an oscillation waveform 10 as shown by FIG. 7(a). This oscillation waveform 10 is transmitted to the reference signal generator 320 including inverter gates 321, 322 and 323, which then produces a signal equal in phase to the oscillation waveform 10 and a signal 20 opposite in phase thereto as shown by FIG. 7(b).

Figure 6A:
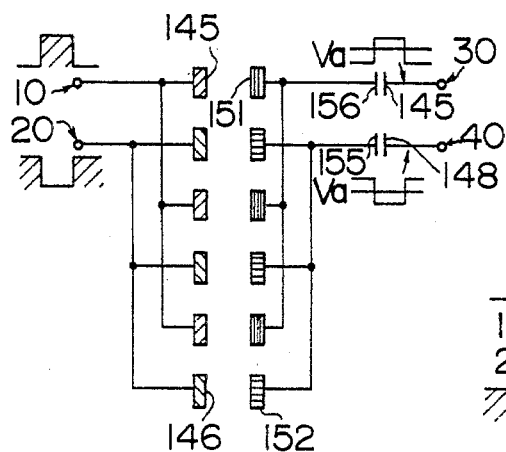
FIGS. 6A and 6B are electric circuit diagrams showing the positional relation between the electrodes upon rotation of a rotating body which diagrams are useful for explaining the operation of the apparatus of FIG. 1.

As shown in FIG. 6A, when the shaft 120 (as illustrated in FIG. 1) rotates, the second plate 150 rotates along therewith so that its first electrode 151 opposes the first electrode 145 of the first plate 140 and that the second electrode 152 of the second plate 150 opposes the second electrode 146 of the first plate 140. At this time, when the signal in phase with the oscillation waveform 10 is applied through the signal line 141 to the first electrode 145 of the first plate 140, the oscillation waveform 10 is passed through a capacitor (as represented by 331 in FIG. 5) formed by the electrode 145 of the first plate 140 and the first electrode 151 of the second plate 150 and appears at the lead metal film 153. Then, this signal in phase with the signal 10 is transmitted through a capacitor (represented by 332 in FIG. 5) formed by the third electrode 156 of the second plate 150 and the third electrode 147 of the first plate 140, and through the junction 23 to the comparator 340 as a signal 30 shown by FIG. 7(c). Similarly, the signal 20 transmitted through the signal line 142 to the second electrode 146 of the first plate 140 is applied through a capacitor (shown at 333 in FIG. 5) formed by the second electrode 146 and the second electrode 152 of the second plate 150, to the second electrode 152 of the second plate 150 as a signal in phase with the signal 20. Then, this signal is fed through a capacitor (shown at 334 in FIG. 5) formed by the fourth electrode 155 of the second plate 150 and the fourth electrode 148 of the first plate 140, and through the junction 24 to the comparator 340 as a signal 40 shown by FIG. 7(d). However, the signals 30 and 40 take the waveform with a reference potential $V_a$ shown by FIGS. 7(c) and 7(d) and which is determined by resistors 343 and 344 of the comparator 340. These signals 30 and 40 are amplified by a differential amplifier which is formed of a resistor 345 and an operational amplifier (hereinafter, referred to simply as OP amp) 346 in the comparator 340. Thus, this differential amplifier produces a signal 50 which is, as shown by FIG. 7(e), delayed by time $\Delta T$ with respect to the oscillation waveform 10, where $\Delta T$ is the delay time in the capacitor response and the switching of the OP amp 346. The signal 50 is shaped in waveform by inverter gates 351 and 352 of the phase detector 350. Thus, to the clock terminal of a D-type flip-flop 354 is applied a signal in phase with the signal 50, and to the clock terminal of a D-type flip-flop 355 a signal opposite in phase to the signal 50. The signal opposite in phase to the oscillation waveform 10 is applied from the CR oscillator 310 through an inverter gate 353 to the data terminals of the D-type flip-flops 354 and 355. Consequently, the D-type flip-flop 354 takes "1" state at the output terminal $Q_1$ and the D-type flip-flop 355 takes "0" state at the output terminal $Q_2$. Then, the stage of NAND gates 356, 357, 358 and 359 thus supplies "0" signal 60 shown by FIG. 7(f) to a signal line 60. This signal is applied to the output circuit 360 in which it is fed through a resistor 361 to a transistor 362, which is thus caused to turn off. As a result, at the output terminal 303 there appears a signal "1" (a signal 70 shown by FIG. 7(g)) indicating that the first electrode 151 of the second plate 150 opposes the first electrode 145 of the first plate 140 (or the second electrode 152 of the second plate 150 opposes the second electrode 146 of the first plate 140).

Figure 6B:
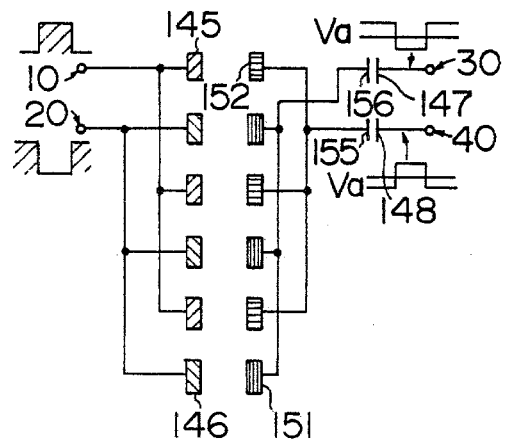

Moreover, as shown in FIG. 6B, when the first electrode 151 of the second plate 150 comes to be opposite to the second electrode 146 of the first plate 140 and the second electrode 152 of the second plate 150 to the first electrode 145 of the first plate 140, the signal in phase with the signal 20 appears at the first electrode 151 of the second plate 150. Then, to the third electrode 147 of the first plate 140 is applied a signal 31 with the reference potential of $V_a$ as shown by FIG. 7(c). In addition, the signal in phase with the oscillation with the oscillation waveform 10 appears at the second electrode 152 of the second plate 150, and then to the fourth electrode 148 of the first plate 140 is applied a signal 41 with the reference potential of $V_a$ as shown by FIG. 7(d). At this time, to the output terminal of the comparator 340 is applied a signal 51 as shown by FIG. 7(e) and thus at the output terminal of the phase detector 350 there appears a signal 61 as shown by FIG. 7(f). Consequently, to the output terminal 303 is applied a signal "0" (a signal 71 as shown by FIG. 7(g)) indicating that the first electrode of 151 of the second plate 150 is opposite to the second electrode 146 of the first plate 140.

Thus, when the first and second electrodes 151 and 152 provided on the second plate 150 are passed above the first and second electrodes 145 and 146 provided on the first plate 140 as the shaft 120 rotates, signals of "1" and "0" alternately appear at the output terminal 303, thereby enabling detection of the rotation of the second plate 150, or the shaft 120.

In this embodiment, the signals appearing at the first and second electrodes 151 and 152 of the second plate 150 are compared by the comparator 340, and thus a large output is produced therefrom in accordance with the difference between the signals at the first and second electrodes 151 and 152, thereby assuring detection of the rotation.

According to an experiment on the embodiment of the invention, the connection metal films 145b and 146b act to reduce the distributed-capacitance effect by an amount corresponding to the thickness of the first plate 140 as compared with the case when the first and second electrodes are respectively connected together on the surface 140a of the first plate 140. Thus, the signal difference appearing between the first and second electrodes 151 and 152 arranged on the second plate 150 becomes so large as to be detected easily thereby assuring the detection of rotation.

While in the above embodiment the first electrodes 145 and the second electrodes 146 arranged on the first stationary plate 140 are respectively connected together on the rear surface, the first electrodes 151 and the second electrodes 152 arranged on the second rotating plate 150 may respectively be connected together or such connection may be made on the rear sides of both the first and second plates 145 and 146.

Moreover, either of the first and second electrodes 151 and 152 arranged on the second plate 150 may be omitted and in this case either of the third and fourth electrodes 155 and 156 will be arranged on the second plate 150. Then, if the signal appearing at either of the electrodes as described above is compared with the reference voltage determined by the resistors 343 and 344 shown in FIG. 5, the detection of rotation can be effected substantially in the same way. Furthermore, the first plate 140 and the second plate 150 may be interchanged to serve as rotating and stationary plates, respectively.

Thus, the rotation position detector according to the invention comprises a first plate having first and second electrodes alternately arranged thereon with a constant spacing in the circumferential direction, and a second plate having electrodes arranged thereon with the same spacing in the circumferential direction to oppose the electrodes on the first plate, at least electrodes arranged on one side of the first and second plates being connected together by connecting metal films on the rear side of the plates through apertures provided on the plates. Therefore, the influence of the distributed capacitance of the metal films is reduced by an amount corresponding to the thickness of plates, thereby enabling static capacitance change to be prevented from decreasing. In addition, these plates can be made of a printed board and thus contribute to reduction in cost.

What is claimed is:

1. A rotational position detecting apparatus comprising:
    a first plate made of insulating material which has on one surface thereof first and second electrodes of metal film alternately and circumferentially arranged at equal intervals in a radial direction thereof and electrically insulated from each other;
    a second plate made of insulating material which has on one surface thereof electrodes of metal film which are circumferentially arranged at equal intervals in a radial direction thereof to oppose the first and second electrodes of the first plate and which are electrically connected to a first and a second circular electrode;
    a rotation detecting circuit for detecting relative rotation of the first and second plates in accordance with the static capacitance change occuring between the electrodes of the first and second plates as one of the plates rotates;
    a plurality of apertures provided in at least one of the plates and corresponding to the first and second electrodes which are alternately arranged on the one surface of one of the plates; and
    connecting metal films provided on the other surface of the first plate at which the apertures are bored, said connecting metal films electrically and alternately connecting the first and second electrodes through the apertures, in order to reduce a static capacitance formed between the electrodes of said first plate and those of said second plate.

2. A rotational position detecting apparatus for detecting the rotation of a rotating member comprising:
    a stationary disk plate supported in a stationary relation to said rotating member and provided on one surface thereof with first and second toothed electrodes electrically insulated from each other and first and second circular electrodes electrically insulated from each other, said first and second toothed electrodes having a plurality of equispaced radial teeth respectively and arranged alternately, and said first and second circular electrodes being insulated electrically from said first and second toothed electrodes;
    a rotatable disk plate rotated by said rotating member and provided with on one surface thereof third and fourth toothed electrodes insulated electrically from each other and third and fourth circular electrodes insulated electrically from each other, said third and fourth toothed electrodes having a plurality of equispaced radial teeth respectively and arranged alternately, said third and fourth circular electrodes being electrically connected to said third and fourth toothed electrodes respectively, and said third and fourth toothed electrodes and said third and fourth circular electrodes being arranged to face said first and second toothed electrodes and said first and second circular electrodes of said stationary disk plate with a spacing respectively;
    a rotation detecting circuit for detecting relative rotation of the stationary and rotatable plates in accordance with the static capacitance change occuring between the electrodes of the plates as one of the plates rotates;
    a plurality of apertures provided in the stationary plate to oppose the first and second toothed electrodes arranged alternately on said one surface of the stationary plate; and
    first and second connecting metal films provided on the other surface of the stationary plate at which the apertures are bored, said first connecting metal film electrically and alternately connecting said first toothed electrode and said second connecting metal film electrically and alternately connecting said second toothed electrode, respectively, through the apertures in order to reduce a static capacitance formed between the electrodes of said stationary plate and those of said rotatable plate.

3. A rotational position detecting apparatus comprising:
    a stationary disk plate supported in a stationary relation to said rotating member and provided with a first and second toothed electrodes electrically insulated from each other and a first and second circular electrodes electrically insulated from each other, said first and second toothed electrodes having a plurality of equispaced radial teeth respectively and arranged alternately, and said first and second circular electrodes being insulated electrically from said first and second toothed electrodes;
    a rotatable disk plate rotated by said rotating member and provided with a third and fourth toothed electrodes insulated electrically from each other and third and fourth circular electrodes insulated electrically from each other, said third and fourth toothed electrodes having a plurality of equispaced radial teeth respectively and arranged alternately, said third and fourth circular electrodes being electrically connected to said third and fourth toothed electrodes respectively, and said third and fourth toothed electrodes and said third and fourth circular electrodes being arranged to face said first and second toothed electrodes and said first and second circular electrodes of said stationary disk plate with a spacing respectively;
    a plurality of apertures provided in said stationary plate to oppose the first and second toothed electrodes arranged alternately on said one surface of said stationary plate;

first and second connecting metal films provided on the other surface of said stationary plate at which the apertures are bored, said first connecting metal film electrically and alternately connecting said first toothed electrode and said second connecting metal film electrically and alternately connecting said second toothed electrode, respectively, through the apertures in order to reduce a static capacitance formed between the electrodes of said stationary plate and those of said rotatable plate;

input circuit means including an oscillator for supplying said first and second toothed electrodes of said stationary disk plate with a first and second periodic signals respectively which are opposite in phase and the same in frequency with each other; and output circuit means including a comparator for receiving output signals produced from said first and second circular electrodes of said stationary disk plate and a phase detector circuit responsive to the comparator output and the oscillator output to derive a rotation signal at every predetermined angular rotation of said rotating member.

* * * * *